Patented Aug. 26, 1947

2,426,540

UNITED STATES PATENT OFFICE 2,426,540

PROCESS OF PRODUCING HYDROCARBON OIL CONCENTRATES OF BARIUM SULFONATES

Franklin M. Watkins, Chicago, Ill., and Theodore A. Hack, Hammond, Ind., assignors to Sinclair Refining Company, New York, N. Y., a corporation of Maine No Drawing. Application June 6, 1945, Serial No. 597,970

5 Claims. (Cl. 260—504)

This invention relates to a process for the production of hydrocarbon oil concentrates of barium sulfonates. Such concentrates are particularly valuable for blending with lubricating oils, in which barium sulfonates act as corrosion inhibitors and are highly effective as crankcase detergents.

In accordance with the process as preferably executed, the barium sulfonate concentrates are produced by first intimately admixing finely divided anhydrous barium hydroxide with a hydrocarbon oil which has been subjected to treatment with concentrated sulfuric acid or oleum. Water is then added to the mixture, following which it is permitted to settle. The product of the process is the lower of the two liquid layers which develop as a consequence of the settling.

Acid oils utilized according to the process may be produced, for example, by the treatment with concentrated sulfuric acid or oleum of heavy petroleum oil fractions, such as Mid-Continent crude base distillates. The acid oil should be sludge-free for the best results. The acid treatment may conform with that applied in connection with the production of certain highly refined petroleum products, such as mineral white oils, electric insulating oils, turbine oils, and the like.

We are aware that barium sulfonates have been previously formed in hydrocarbon oil by treatment of oil containing sulfonic acids with barium hydroxide. However, we do not believe that it has ever been realized before that it is possible to concentrate the barium sulfonates in the oil in the manner of our invention. In the absence of concentration of the sulfonates in the oil, the oil is of little use for blending with lubricating oils because, in order that the blend will have an effective concentration of the sulfonates, it is necessary to use such a large amount of the oil as to adversely affect the viscosity characteristics of the lubricating oil. A further disadvantage of oils in which the sulfonates have not been concentrated, from the standpoint of their use as blending agents, is the high storage cost per pound of sulfonates.

In the practice of our invention, we have found that the degree of subdivision of the barium hydroxide is a critical factor. Two other critical factors are the ratio of water employed and the length of the mixing period following addition of the water.

We generally and preferably carry out the reaction between the barium hydroxide and acid oil at a temperature within the range 70° F.–110° F., but the reaction may be successfully executed at somewhat higher or lower temperatures. Temperatures higher than 135° F. are to be avoided, however, since such temperatures result in adverse decomposition of the acid oil. At temperatures below 50° F., the oil may be so viscous as to complicate the mixing-in of the barium hydroxide. In the preferred practice of the invention, the necessary agitation to insure uniform suspension of the barium hydroxide throughout the acid oil is accomplished by admitting air under pressure into the containing vessel or tank. We also prefer to effect agitation of the mixture after the water addition with air, but in either case mechanical means may be used.

For the successful execution of our process, the barium hydroxide must have a particle size of not substantially coarser than 100 mesh, i. e. all of the barium hydroxide must pass through a standard 100-mesh sieve. Particularly good results have been obtained with barium hydroxide having a particle size of about 200 mesh. A particle size of the order of 200 mesh is especially important when using crystalline barium hydroxide ($Ba(OH)_2 \cdot 8H_2O$), rather than powdered anhydrous barium hydroxide. Irrespective of whether the anhydrous or crystalline material is used, the barium hydroxide is best employed in substantial excess. Generally and preferably we use twice the amount required to completely neutralize the oil as determined by its acid number.

When employing crystalline barium hydroxide, we may not add additional water, but may depend for reaction entirely on the water present in the barium hydroxide. Thus, we may immediately settle the reaction mixture, without prior addition of water, after having agitated the comminuted crystalline barium hydroxide with the acid oil for a period of time sufficient to insure complete neutralization of the oil. Reduction of the temperature to below about 50° F. may be necessary in order to settle out the concentrate where crystalline barium hydroxide has been used.

It is essential in the practice of our process that the water in the reaction mixture, whether it represents added water, or water derived totally or in part from the barium hydroxide, does not account for less than 2.2% or more than about 7% of the weight of the reaction mixture. The preferred amount of water is 2.25–2.75%. This ratio is preferred because the resulting layers separate rapidly and have a minimum tendency to remix. When over 2.75% water is used, prolonged mixing may result in the formation of a homogeneous mixture which will not stratify on standing. Even when operating with the preferred amount of water, prolonged mixing is to be avoided. We preferably do not extend the mixing period after addition of water beyond 30 minutes.

It will be apparent that the sulfonate content of the upper of the two liquid layers formed upon settling of the reaction mixture is a measure of the efficacy of the concentration procedure. The following table compiled from the results of an experiment in which samples were removed from the reaction mixture at 5-minute intervals, beginning at 15 minutes after separate water addition, tends to show that the longer the agitation period after water addition, the smaller will be the concentration of the sulfonates in the lower or product layer. In the experiment of the table, an excess anhydrous barium hydroxide and an amount of water within the preferred range, supra, were employed. The oil involved was a Mid-Continent crude base distillate. Agitation was with air.

Table I

| Sample Removed (Minutes after $H_2O$ added) | Analysis of Upper (supernatant) Layer (Per cent $SO_4$ Ash) |
|---|---|
| 15 | .47 |
| 20 | .56 |
| 25 | .67 |
| 30 | .85 |

As further illustrative of the practice of the invention we submit the following example:

*Example*

A 311-gram charge of an acid oil prepared by the treatment of a Mid-Continent crude base distillate with multiple dumps of oleum, 120 pounds of oleum having been used for each barrel of oil, was placed in a 500 ml. separatory funnel. The separatory funnel was then immersed in a water bath so that the temperature of the acid oil could be maintained at about 100° F. 12.9 grams of dry barium hydroxide, powdered to pass a 200-mesh screen was added. The amount of barium hydroxide represented 200% of the amount required to completely neutralize the acidity of the acid oil which had an acid number of 13.0 mgs. of potassium hydroxide per gram of oil. The mixture of acid oil and barium hydroxide was violently agitated with air for 40 minutes to suspend the barium hydroxide uniformly throughout the body of the acid oil. After the 40-minute air blow, 7.4 grams of water, or 2.4% water based on the total acid oil weight was poured into the mixture. The air blow was continued and in 1–1½ minutes after the water addition, the acid oil color was discharged. One ounce samples were drawn every 5 minutes after water addition and allowed to stand at room temperature. The 5 and 10-minute samples separated into two liquid layers in approximately 30 minutes. However, the 20 and 25-minute samples did not separate for 6 to 8 hours. In the case of each sample, the upper layer was clear and of low viscosity, while the bottom or concentrate layer had the appearance of a heavy emulsion and was quite viscous. The concentrate represented 40–50% of the volume of the total liquid, while the sulfonate concentration in the concentrate ranged from about 20 to 25%. One sample stored for 22 days in a stoppered 4-ounce bottle was shaken several times each day and each time settled at an excellent rate.

The results of other runs, including runs carried out with crystalline barium hydroxide are given in Table II. In each of these runs, 200% of the theoretical amount of barium hydroxide required for neutralization of the acid oil, which had an acid number of 13.0, was used. From the table, it will be noted, inter alia, that no concentrate was formed in the instance of runs 7 to 11 inclusive, where the barium hydroxide was coarser than 100 mesh; also that in run IV, where less than 2.2% water was used, no concentrate developed upon settling of the reaction mixture. In runs II, III, V, and XIII, concentrates resulted upon settling after only 2½ minutes stirring, following water addition. Concentrates could not be settled out in these runs from samples withdrawn after the mixtures had been stirred after water addition for 25, 5, 15, and 90 minutes, respectively.

Table II

| Experiment No. | 1 | 2 | 3 | 4 | 5 | 6 | 7 | 8 | 9 | 10 | 11 | 12 | 13 |
|---|---|---|---|---|---|---|---|---|---|---|---|---|---|
| Type of $Ba(OH)_2$ Used | Dry | Dry | Dry | Dry | Dry | Dry | Dry | Dry | Crystal. | Crystal. | Crystal. | Crystal. | Dry |
| Wt. of $Ba(OH)_2$ Used, g | 12.9 | 12.9 | 12.9 | 12.9 | 12.9 | 12.9 | 12.9 | 12.9 | 22.7 | 22.7 | 22.7 | 22.7 | 12.9 |
| Mesh (100% Passes) | 200 | 200 | 200 | 200 | 200 | 200 | 50 | 50 | 10 | 10 | 50 | 200 | 200 |
| Mixing Time Before $H_2O$ Addition, Minutes | 40 | 40 | 40 | 40 | 40 | 40 | 40 | 40 | | 60 | 40 | | 40 |
| Oil Temp. Before $H_2O$ Addition, °F | 100 | 100 | 100 | 100 | 100 | 160 | 100 | 160 | 100 | 100 | 100 | 125–130 | 50 |
| Per cent $H_2O$ Added (Wt. % on Oil Used) | 2.4 | 2.4 | 2.25 | 2.0 | 6.5 | 2.0 | 2.4 | 2.4 | None | 0.25 | None | None | 2.4 |
| Time Req'd. to Discharge Acid Oil Color, Minutes | 1–1½ | 1–1½ | 1½ | 1½–2 | ¼–½ | 1–1½ | 15–20 | 8–10 | 90 | 60 | 75 | 2 | 9–10 |
| Concentrate Formed | Yes | Yes | Yes | No | Yes | Yes | No | No | No | No | No | Yes | Yes |
| Minimum Stirring, Minutes | 5 | 2½ | 2½ | | 2½ | 5 | | | | | | 5 | 2½ |
| Maximum Stirring, Minutes | 25 | 25 | 5 | | 15 | 6 | | | | | | 10 | 90 |

The inspections on three typical oils which may be acid treated and employed in the process of the invention are given below. Each of these oils represents a Mid-Continent crude base distillate.

Table III

| | Oil A | Oil B | Oil C |
|---|---|---|---|
| Gravity | 24.4 | 26.9 | 23.3 |
| Flash | 395 | 370 | 445 |
| Fire | 455 | 420 | 510 |
| Vis. @: | | | |
| 100 | 220.4 | 110.6 | 468.7 |
| 130 | 106.8 | 65.6 | 195.2 |
| 210 | 44.7 | 39.3 | 55.2 |
| Pour | +10 | +10 | +5 |
| Color | 3½− | 3++ | 4−(7++) |
| Per cent Sulfur | 0.79 | 0.47 | 0.53 |

It is clear to us that our ability to prepare concentrates of barium sulfonates in the manner described is due to the fact that under the controlled conditions under which we operate, the sulfonates are produced, and for the necessary period, are maintained, in an oil-insoluble form. Although we are not to be held for the accuracy of any theories advanced herein, we believe it probable that the sulfonates in the concentrate are hydrated hydroxy sulfonates conforming to the formula, $RSO_3BaOH.xH_2O$. In any event, heating of the concentrate to a temperature sufficient to dehydrate it causes permanent conversion to the useful oil-soluble sulfonates.

We claim:

1. A process for producing petroleum oil concentrates of barium sulfonates which comprises agitating for a period not exceeding about 30 minutes a sulfuric acid-treated Mid-Continent crude base distillate at a temperature between 50° F. and 135° F. with anhydrous barium hydroxide having a particle size of not substantially coarser than about 100 mesh, the barium hydroxide being employed in substantial excess as determined by the acid number of the oil, adding to and intimately admixing with the mixture of oil and barium hydroxide from 2.2 to 7% of water, allowing the aqueous mixture to settle until formation of two layers occurs, the mixing period following addition of the water having been of a duration insufficient to result in the formation of a homogeneous reaction mixture, and separating the lower layer, having a relatively high concentration of barium sulfonates, from the upper layer, having a relatively low concentration of barium sulfonates.

2. A process for producing petroleum oil concentrates of barium sulfonates which comprises agitating with air and at a temperature between 70° F. and 110° F. an oleum-treated petroleum oil with anhydrous barium hydroxide having a particle size of about 200 mesh, the amount of barium hydroxide employed being equal to about twice the amount required to completely neutralize the acid oil, adding to the mixture of oil and barium hydroxide from 2.25 to 2.75% of water, agitating the aqueous mixture with air for a period not exceeding 30 minutes, allowing the mixture to settle until the formation of two layers occurs and separating the lower layer, having a relatively high concentration of barium sulfonates, from the upper layer, having a relatively low concentration of barium sulfonates.

3. A process for producing petroleum oil concentrates of barium sulfonates which comprises agitating with air for a period not exceeding about 30 minutes and at a temperature between 70° F. and 110° F. a mixture of crystalline barium hydroxide having a particle size of about 200 mesh and a sulfuric acid-treated petroleum oil, the amount of barium hydroxide being equal to about twice the amount required to completely neutralize the acid oil, allowing the mixture to settle until the formation of two liquid layers occurs, the agitation period having been of a duration insufficient to result in the formation of a homogeneous mixture, and separating the lower layer, having a relatively high concentration of barium sulfonates, from the upper layer, having a relatively low concentration of barium sulfonates.

4. A process for producing hydrocarbon oil concentrates of barium sulfonates which comprises agitating for a period not exceeding about 30 minutes at a temperature below 135° F. a mixture of sulfuric acid-treated hydrocarbon oil, an amount of barium hydroxide having a particle size not coarser than about 100 mesh greater than that theoretically required to neutralize the acid oil, and an amount of water equivalent to from 2.2 to 7% of the weight of the mixture, part or all of the water being derived from the barium hydroxide where crystalline barium hydroxide is used, allowing the aqueous mixture to settle until the formation of two layers occurs, the agitation period having been of a duration insufficient to result in the formation of a homogeneous reaction mixture, and separating the lower layer, having a relatively high concentration of barium sulfonates, from the upper layer, having a relatively low concentration of barium sulfonates.

5. A process for producing hydrocarbon oil concentrates of barium sulfonates which comprises forming an intimate mixture of sulfuric acid-treated hydrocarbon oil and anhydrous barium hydroxide having a particle size not coarser than about 100 mesh at a temperature below 135° F., the proportion of barium hydroxide being in excess of that required to completely neutralize the acid oil, agitating the mixture for a period not exceeding about 30 minutes with from 2.2 to 7% of water, allowing the aqueous mixture to settle until the formation of two layers occurs, the agitation period having been of a duration insufficient to result in the formation of a homogeneous reaction mixture, and separating the lower layer, having a relatively high concentration of barium sulfonates, from the upper layer, having a relatively low concentration of barium sulfonates.

FRANKLIN M. WATKINS.
THEODORE A. HACK.

REFERENCES CITED

The following references are of record in the file of this patent:

UNITED STATES PATENTS

| Number | Name | Date |
|---|---|---|
| 2,395,713 | Barbour | Feb. 26, 1946 |
| 2,381,708 | Amott | Aug. 7, 1945 |
| 2,361,476 | Higbee | Oct. 31, 1944 |
| 2,361,804 | Wilson | Oct. 31, 1944 |
| 2,279,086 | Bergstrom | Apr. 7, 1942 |